E. ROSENBERGER.
GEAR CASING.
APPLICATION FILED MAR. 25, 1909.
929,329.
Patented July 27, 1909.
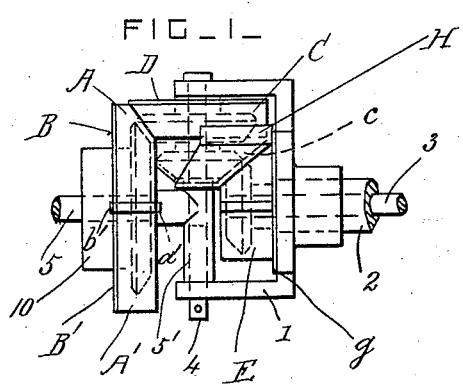
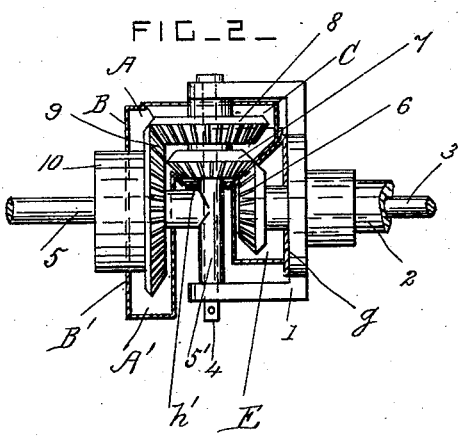
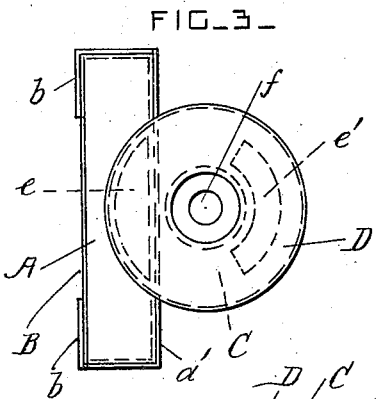
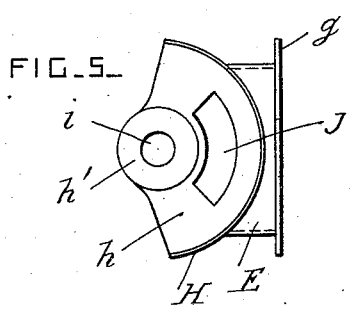
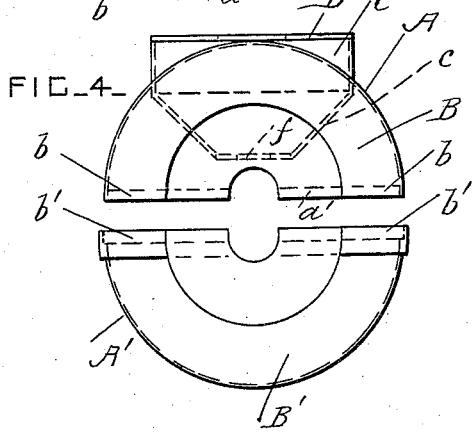
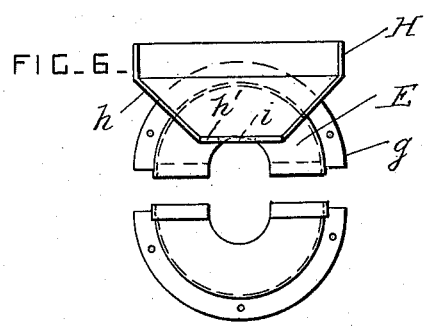
Witnesses
Geo. C. Pendleton
Arthur D. Kunze
Inventor
Ernst Rosenberger.
Herbert W. Jenner.
By
Attorney

UNITED STATES PATENT OFFICE.

ERNST ROSENBERGER, OF MANKATO, MINNESOTA.

GEAR-CASING.

No. 929,329.        Specification of Letters Patent.        Patented July 27, 1909.

Application filed March 25, 1909. Serial No. 485,689.

*To all whom it may concern:*

Be it known that I, ERNST ROSENBERGER, a citizen of the United States, residing at Mankato, in the county of Blue Earth and State of Minnesota, have invented certain new and useful Improvements in Gear-Casings; and I do hereby declare the following to be a full, clear, and exact description of the invention, such as will enable others skilled in the art to which it appertains to make and use the same.

This invention relates to casings for inclosing the gear wheels used in connection with the steering mechanism of motor vehicles; and it consists in the novel construction and combination of the parts hereinafter fully described and claimed.

In the drawings, Figure 1 is a side view of a gear casing. Fig. 2 is a vertical section through the gear casing. Fig. 3 is a detail plan view of a portion of the casing which covers the driven wheel. Fig. 4 is an end view of the portion of the casing shown in Fig. 3, with its parts separated. Fig. 5 is a plan view of the portion of the casing which covers the driving wheel. Fig. 6 is an end view of the portion of the casing shown in Fig. 5, with its parts separated.

A forked bracket 1 is secured on the end portion of the tubular axle 2, and 3 is a driving shaft which is journaled in the axle 2. A vertical pin 4 is arranged in the fork of the bracket 1, and a bearing-spindle 5 for a road-wheel is pivoted to swing horizontally on the pin 4.

A driving-wheel 6 is secured on the shaft 3 and meshes with a wheel 7 journaled on the pin 4. A wheel 8 is secured to the wheel 7 and revolves with it on the pin 4. The wheel 8 meshes with a wheel 9 provided with a hub 10 which is journaled on the spindle 5. All the abovementioned wheels are beveled toothed wheels. In order that these wheels may revolve freely and be protected from dust, they are inclosed in a casing and are arranged to run in oil. The casing is formed of articulated sections so that it can adapt itself to the horizontal movements of the spindle 5 by which the steering of the vehicle is effected.

A is the upper part of a cylindrical section of the casing which encircles the driven wheel 9. This section of the casing is formed in two parts, and the lower part A' is made separate from the upper part A and is provided with an overlapping portion or lug $a'$ on its end plate which enters a recess in the end plate of the upper part.

B and B' are semicircular end plates, having overlapping portions $b\ b'$, which encircle the hub 10, and which close the parts A and A' respectively. The parts A A' B B' are all secured together, after being assembled together around the wheel, by any approved means. They may be soldered together, or they may be secured by any approved fastening devices. The upper part A has upon one side a chamber C which is circular at its top, and which has tapering side portions $c$ which encircle the wheels 7 and 8. The chamber C has two openings $e$ and $e'$, on opposite sides of its center, and it has a center hole $f$ which fits around the sleeve 5' of the spindle 5 which is mounted on the pin 4.

D is a lid which closes the top of the chamber C so that it is dust-proof. This lid has a central hole which encircles the hub of the wheel 8.

E is another section of the casing the main portion of which is substantially cylindrical, and which has a plate $g$. This plate $g$ is secured to the bracket 1 by screws, or in any other convenient manner, so that the circular portion of the casing section surrounds the wheel 6. The upper portion of the part E has a curved plate H, which fits closely and is articulated with the outside of the chamber C. The plate H is formed with a tapering lower portion $h$ which works closely in connection with the lower tapering portion of the chamber C, and which has a bottom part $h'$. The bottom part $h'$ is arranged under the bottom of the chamber C, so that it assists in supporting it in position, and it has a hole $i$ which fits around the sleeve 5' of the spindle 5 which is mounted on the pin 4. The casing section E has also a hole $j$ which comes under the opening $e'$ so that the teeth of the wheels 6 and 7 can gear together. The teeth of the wheels 8 and 9 gear together through the opening $e$ in the chamber C.

Oil is poured into or fed into the casing sections in any approved way so that the wheel teeth may run in oil, and the sections of the casing are constructed so that they slide one over the other without permitting the oil to run out wastefully or dust to enter.

What I claim is:

1. The combination, with intergearing wheels, of a casing for the wheels formed of separate portions, one portion being arranged to encircle one wheel and having a laterally projecting chamber, and the other portion being arranged to encircle another wheel and having a curved and laterally projecting part which is slidable upon the walls of the said chamber, the walls of the said chamber and the said projecting part being arranged to encircle the remaining wheels and permitting one of the wheels to be oscillated.

2. The combination, with intergearing wheels, of a casing for the wheels formed of separate portions which slide one upon the other and which permit one of the wheels to be oscillated, one of the said portions having a projecting chamber, and the other portion having a curved plate which fits against the walls of the said chamber and which has a bottom portion which overlaps the bottom of the said chamber and assists in holding the said chamber in position.

In testimony whereof I have affixed my signature in the presence of two witnesses.

ERNST ROSENBERGER.

Witnesses:
 ERNEST R. BROWN,
 ANNA SCHULZE.